United States Patent
Ehrhart et al.

(10) Patent No.: US 6,959,237 B2
(45) Date of Patent: Oct. 25, 2005

(54) ELECTRIC DRIVE SYSTEM, ESPECIALLY FOR VEHICLES

(75) Inventors: Peter Ehrhart, München (DE); Christof Scherg, Penzberg (DE); Werner Weck, Starnberg (DE)

(73) Assignee: Magnet-Motor Gesellschaft fur Magnetmotorische Technik mbH, Starnberg (DE)

( * ) Notice: Subject to any disclaimer, the term of this patent is extended or adjusted under 35 U.S.C. 154(b) by 103 days.

(21) Appl. No.: 10/450,059

(22) PCT Filed: Dec. 11, 2001

(86) PCT No.: PCT/EP01/14549
§ 371 (c)(1),
(2), (4) Date: Oct. 10, 2003

(87) PCT Pub. No.: WO02/47935
PCT Pub. Date: Jun. 20, 2002

(65) Prior Publication Data
US 2004/0061336 A1    Apr. 1, 2004

(30) Foreign Application Priority Data
Dec. 11, 2000 (DE) ................................ 100 61 659

(51) Int. Cl.[7] ............................ G05B 23/02; G06F 7/00
(52) U.S. Cl. ........................... 701/36; 701/29; 701/48; 710/110; 340/3.43; 340/3.44; 318/16
(58) Field of Search .................. 318/16, 586, 587, 318/628; 361/23, 78; 701/33, 36, 29, 48; 710/110; 709/208, 253; 307/9.1; 370/235; 340/3.43, 3.44; 324/522, 528

(56) References Cited

U.S. PATENT DOCUMENTS

| 3,161,083 A | 12/1964 | Roe et al. |
| 4,554,989 A | 11/1985 | Stopke et al. |
| 5,343,971 A | 9/1994 | Heidelberg et al. |

(Continued)

FOREIGN PATENT DOCUMENTS

| DE | 196 24 090 C | 10/1997 |
| DE | 197 07 763 C1 | 4/1998 |

(Continued)

*Primary Examiner*—Marlon T. Fletcher
*Assistant Examiner*—Eduardo Colon Santana
(74) *Attorney, Agent, or Firm*—Venable LLP; Robert Kinberg; Steven J. Schwarz

(57) ABSTRACT

For enhancing the operational safety of an electric drive unit of a vehicle comprising a generator, which is operated by a combustion machine, and drive motors, which are connected to said generator via a direct-voltage intermediate circuit, the generator and drive motors are each subdivided into partial units, and these partial units have partial power electronics units associated therewith. The mutually corresponding partial units of generator, motors and power electronics units each constitute a drive circuit of their own, with control signals being supplied to components thereof by a specifically assigned system control unit. The system control units that are interconnected via an information exchange channel can undertake compensation measures in their drive circuit or in the other drive circuits in the event of a complete or partial failure of a drive circuit. As an alter-native to the assignment of one system control unit at a time to a drive circuit, here may also be several system control units connected to the individual drive circuits via bus connections or via multiple single channels.

20 Claims, 2 Drawing Sheets

U.S. PATENT DOCUMENTS

| | | | | |
|---|---|---|---|---|
| 5,369,584 A | * | 11/1994 | Kajiwara | 701/48 |
| 5,481,906 A | * | 1/1996 | Nagayoshi et al. | 73/116 |
| 5,586,034 A | * | 12/1996 | Takaba et al. | 701/102 |
| 5,788,003 A | * | 8/1998 | Spiers | 180/65.2 |
| 5,941,925 A | * | 8/1999 | Hess et al. | 701/91 |
| 6,201,316 B1 | * | 3/2001 | Knecht | 307/10.1 |
| 6,223,104 B1 | * | 4/2001 | Kamen et al. | 701/1 |
| 6,282,668 B1 | * | 8/2001 | Neudecker | 713/324 |
| 6,360,152 B1 | * | 3/2002 | Ishibashi et al. | 701/48 |
| 6,434,459 B2 | * | 8/2002 | Wong et al. | 701/36 |
| 6,622,804 B2 | * | 9/2003 | Schmitz et al. | 180/65.2 |
| 6,687,585 B1 | * | 2/2004 | Rizzoni et al. | 701/29 |
| 6,816,764 B2 | * | 11/2004 | Coelingh et al. | 701/37 |

FOREIGN PATENT DOCUMENTS

| | | |
|---|---|---|
| DE | 197 32 764 A | 2/1999 |
| DE | 198 02 549 C1 | 2/1999 |
| EP | 1 020 986 A | 7/2000 |
| EP | 1 049 599 B1 | 5/2002 |

* cited by examiner

ELECTRIC DRIVE SYSTEM, ESPECIALLY FOR VEHICLES

CROSS-REFERENCE TO RELATED APPLICATIONS

The present application is the U.S. National Stage of International Application No. PCT/EP01/14549, filed on Dec. 11, 2001, which claims priority of German Patent Application No. 100 61 659.3, filed on Dec. 11, 2000, the priority of which is also claimed by the present application. The entire content of the foregoing applications is incorporated herein by reference.

BACKGROUND OF THE INVENTION

1. Field of the Invention

The invention relates to an electric drive system, in particular for vehicles. Specifically, it is concerned with a drive system comprising two or more drive motors, at least one generator driven by a combustion machine, and one or more power electronics units associated with the drive motors and the generators, with the arrangement of drive motors, generator and power electronics units being controlled by a control means in accordance with the settings/operations of operating elements.

2. Description of the Related Art

Electric drive systems of this kind are known. The electric power demanded from the two or more drive motors has to be made available by the generator. In accordance with the power demanded, the combustion engine driving the generator has to be controlled and regulated. The power electronics unit associated with the generator converts the alternating voltage supplied from the generator into direct voltage. The output of the power electronics unit associated with the generator constitutes a direct-voltage intermediate circuit from which the power electronics units associated with the drive motors and acting as inverters, drain electric power.

The present invention is concerned with the problem of operational safety of such an electric drive system: in case of failure of the generator of such a drive system, this corresponds to an overall failure of the drive system. However, the situation is similar also in case of failure of one of the plurality of electric drive motors, at least when, in case of a track-laying vehicle, one drive motor drives one driving chain or track on one side of the vehicle and the other motor is in charge of the drive on the other side of the vehicle; for, in that event, the vehicle virtually would not be maneuverable any more.

To solve specifically the problem addressed hereinbefore, there has already a suggestion been made, namely to split generator and drive motors as well as power electronics units belonging to the drive motors into two or more partial units each and to provide a kind of "crossover connection" in the sense that, in case of splitting into two partial units each in a motor vehicle drive system having separate drives for the left-hand and right-hand vehicle sides, the two power units on the left-hand side feed a partial drive unit on the left-hand side and a partial drive unit on the right-hand side, with this applying to the other vehicle side in corresponding manner. The effect achieved thereby is that, for example, in case of a malfunction of a partial drive unit on one vehicle side, the still intact partial drive unit provided there is fed from a power unit of the other vehicle side, so that partial load operation of the vehicle is still possible by corresponding compensation measures. The generator may be connected to the power electronics units via separate circuits which in turn can each be fed by a generator of their own. The generator or generators have no power electronics unit of their own associated therewith.

With the solution in the form of a "crossover coupling" as described hereinbefore, the power units feeding the drive means are controlled by several control units via signal bus lines. The combinations of power units and motor units provided for the individual vehicle sides are accessible from the control means via the power units only. There is no unequivocal association of the drive motors with partial power units. In case of failure of a partial power unit on one vehicle side including the partial drive motor directly connected thereto, the associated partial power unit reacts by deactivating the partial drive motor on the other vehicle side that is coupled therewith. The "crossover coupling" thus indeed permits a rapid reaction of the partial power units in case of failure of the respective partial power units that are associated in pairs thereto, however, it is possible to still further develop the arrangement with respect to the possible flexibility thereof.

BRIEF SUMMARY OF THE INVENTION

It is the object of the present invention to make available an electric drive system of the type outlined at the beginning, which achieves a maximum of operational safety in the event of failure of one or more components.

To this end, the present invention provides a drive system in particular for vehicles, comprising:
a) at least two drive motors are subdivided into at least two partial motors each;
b) at least one generator driven by a combustion machine is subdivided into at least two partial generators,
c) the drive motors and the generator each have a power electronics unit associated therewith that is subdivided into at least two independent partial power electronics units, i.e. first, second, etc. power electronics units,
d) there are provided at least two superior system control units connected via control lines to the drive motors, the generator and/or the power electronics units;
e) the system control units have operating elements connected thereto;
f) the independent partial electronics units are associated with the partial motors and the partial generators in a correspondence of 1:1 each;
g) preferably, the first, second, etc. partial electronics units of the drive motors are each connected to each other on the input side and to the output sides of the partial electronics units of the generator so as to form first, second, etc. drive circuits;
h1) the first, second, etc. drive circuits have first, second, etc. ones of the superior system control units associated therewith; or
h2) the system control units are associated with all drive circuits; and
i) the system control units are mutually connected via an information exchange channel and contain a detector means for sensing a failure of one or more drive circuits.

This electric drive system according to the invention makes consequent use of the so-called multiple principle developed by the applicant, i.e. the splitting of the drive motors, the generator and the power electronics units into respective partial elements, in which first partial elements, i.e. for example the first partial generator power unit, a first partial motor power unit for the first motor and a first partial motor power unit for the second motor, constitute a first drive circuit. Each drive circuit thus consists of several partial motors, a partial generator and a respectively associated partial power electronics unit, which have a direct-voltage intermediate circuit associated therewith—between partial generator and the partial motors and the partial power electronics units associated with these components.

The connection of the system control units to the drive motors, the generator and/or the power electronics units may be established either directly from the respective system control unit to the drive motors, the generator and/or the individual power electronics units, but it is also possible to employ the variation of passing the control lines from the system control units to the power electronics units and to pass the lines from there onwards to the drive motors and the generator, respectively. As a further possible alternative for connecting the system control units to the drive motors etc., it is possible to utilize a bus system as it is known to the skilled person from numerous other fields of application.

According to a further development of the splitting of the generator to partial generators, it is also possible to provide mutually separate generators having a drive of their own each in the form of a combustion power engine.

It is also possible to associate with the drive circuits a plurality of combustion engines having individually associated generators (multi-motor principle). Together with their associated power electronics units, these generators then operate as partial generators in the sense outlined.

In a first variation of the invention (feature h1), the afore-mentioned splitting into individual drive circuits is continued in consequent manner to the system control units, i.e. each drive circuit has specifically one system control unit associated therewith. Due to the fact that these system control units are mutually connected via an information exchange channel, the system—as regards the system control units—is made safe against failure of one or more system control units as long as at least one system control unit remains operable. By detection of a failure of one or more drive circuits, the system control unit(s) associated with the still intact drive circuit or circuits can react on the failure and control the remaining components of the drive system in corresponding fashion.

In a second variation of the system (feature h2), the system control units are associated with all drive circuits. This leads to the situation that each system control unit constitutes an equivalent control unit for each drive circuit present. In addition thereto, the degree of freedom as regards the ratio of the number of system control units to the number of drive circuits present becomes greater as compared to the first variation outlined hereinbefore. It is thus possible to feed three separate drive circuits with the aid of two control units, but it is also possible to provide three or four system control units for two separate drive circuits.

Of particular significance is also the information exchange channel between the system control units in conjunction with the detector means for sensing the operating state of the drive circuits. In case complete or partial failure of one or more drive circuits is detected, this information is exchanged between the system control units (in so far as these are operable), so that compensation of the failed parts can be effected rapidly.

In a specific embodiment of the invention (feature h2'), the drive circuits each have several input channels, each one thereof being connected to a different system control unit, e.g. via a bus line. In this fashion, each system control unit has knowledge of the operating states in each drive circuit. Alternatively (feature h2"), the system control units have several control channels each, the number thereof corresponding to that of the drive circuits wich in turn have control channels in a number equal to that of the system control units, with one control channel each of the first, second, etc., system control units being connected to one control channel each of the drive circuits. This variation with a plurality of separate channels (in contrast to a bus line system, for example) has the advantage of enhanced safety against malfunction in the signal transmission channels. While in case of malfunction of a bus line the related system control unit possibly is completely uncoupled from all drive circuits, the multi-channel design, in case of malfunction of a channel, still provides for a connection via the remaining channels.

A specific development of the invention provides that the system control units perform control so as to establish a symmetric mode of operation in the individual electric drive circuits, i.e. the motors and the generator as well as in the power electronics units. The term "symmetric mode of operation" means here that all partial units, i.e. the partial generator units, the partial motor units of each motor and the corresponding partial power electronics units, are each subject to uniform loads.

As an alternative to this uniform loading of the partial units, a further development of the invention consists in that the system control units control the drive circuits such that each drive circuit is in charge of a defined portion of the total power and individual drive circuits are successively turned off and on in accordance with the power demanded. This alternative design has advantages over the symmetric mode of operation, as evidenced by the following example: in case of a total power of e.g. 600 kW of the drive system and with a total of three drive circuits, the first one of these three drive circuits may serve 0–200 kW, the second drive circuit 200–400 kW and the third drive circuit 400–600 kW. In the lower power range between 0 and 200 kW, the second and third drive circuits can be turned off completely, and in case of operation in the middle power range, the third drive circuit can be turned off completely. Complete turning off means that no basic losses whatsoever arise which, in case of operation of a drive circuit in its lower power range, entail a considerable deterioration of the efficiency.

The afore-described mode of operation of the individual drive circuits dependent upon the demanded total power, in case of a rigid association of the individual drive circuits with the different power ranges of the overall system, may lead to a considerable unbalanced distribution of the loading to the individual drive circuits. For, with this rigid system, the drive circuit in charge of the lower power range is always subject to loads in operation, the drive circuit in charge of the middle power range is subject to average loads, and the drive circuit in charge of the upper power range is subject to loads relatively seldom.

To obtain as uniform as possible loading of the individual drive circuits in the frame of middle and longer times, it is thus provided in accordance with a specific development that the system control units provide for permutation of the association of the drive circuits with respect to the related part of the total power in a time pattern. The effect achieved by way of this exchange of the drive circuits through the various ranges of power association is that, in contrast to a rigid association, the drive circuit assigned to the lower power range is not permanently subject to loads, but in the average to approx. 33% of the total operating time.

In a preferred development, the drive circuits have electric means for taking up electric energy associated therewith, these electric means being in particular brake means associated with the individual partial electronics units of the drive motors.

By means of associated power electronics units, the drive motors can also operate as brake generators and be used for decelerating the correspondingly equipped vehicle. In this context, the individual drive circuits have suitable electric means connected thereinto which serve to take up the electric energy (braking electronics system and brake resistors or an electric energy accumulator). It is particularly preferred to directly associate the electric brake means with the partial electronics units of the drive motors in order to thus increase the operational safety and reliability of the electric brake means in case of system defects.

In a specific development thereof, the afore-mentioned brake electronics system or brake means are accommodated in a common housing together with the power electronics units or the partial electronics units.

In a further development of the invention, the superior system control units engage in control and regulation of the combustion engine. This provides for the important advantage that the operation of the combustion engine can be matched to particular operational requirements and also to specific operational strategies.

In case of a plurality of combustion engines, the system control units access all engines simultaneously. The control criteria mentioned hold in corresponding fashion for the drive circuits.

Due to the connection of the superior system control units by way of an information exchange channel, there is the possibility that the system control units are mutually coordinated in the sense that they control the drive circuits such that a defined power/torque presetting is applied to all drive motors or partial drive motors, respectively. Specifically, this may have the effect that the system control units provide for presetting of a defined superimposition power or a defined superimposition torque on one or more drive motors or partial drive motors. Such control is particularly interesting in case the steering system of a vehicle is to be supported or is to be realized exclusively as in case of a tracklaying vehicle, for example. Apart from the "normal" wheel steering method, there is provided a support in the form of so-called lateral wheel steering, which is the supporting generation of additional torques or additional power at the outer wheel or wheels of the vehicle during cornering.

Especially advantageous is the coordination of the drive circuits which, in case of a vehicle, are preferably associated with the left-hand and right-hand vehicle sides, respectively, when the system control units receive feedback information from the drive motors or the power electronics units associated with the drive motors, on the actually output powers/torques so as to process the same in the regulating operation.

When the electric drive system according to the invention is designed for a given total power, the individual drive circuits in case of a given number of drive circuits may be designed for a corresponding fraction of the total power. However, it is preferred according to the invention that the proportional power of each individual drive circuit is increased to such an extent that, in case of failure of a drive circuit, this failure can be compensated at least in part by the remaining drive circuits.

Considering the, in the instant case, preferred utilization of the electric drive system according to the invention in a vehicle, additional consumers are to be considered as well according to the invention, with the term additional consumers being understood to include all electric consumers except for the drive motors. Usually, the electric additional consumers in a vehicle are fed via the normal on-board network (battery). However, in case of certain additional consumers it is advantageous when these are not fed via the usual on-board network, but via one or more drive circuits of the electric drive system according to the invention, i.e. via one or more direct-voltage intermediate circuits of the drive system. The voltage that can be tapped there, which is higher than the voltage of the normal on-board network, is more favorable for suitable electric additional consumers; for, these may then be designed for a higher voltage and be fed with this increased voltage. As an example, reference is made to coolant pumps, blowers etc.

To make the afore-mentioned suitable electric additional consumers secure against possible failure, the invention provides according to a specific development thereof that the additional consumers are selectively switched or connected to one of the drive circuits provided.

A further development provides that the drive circuits are interconnected on the supply side, i.e. that the current lines between the partial electronics units are interconnected. This means that the outputs of the partial electronics units of the generator are connected in parallel and that there still is only one common supply left.

It is provided according to another development of the invention that there are electric energy-storing primary/secondary elements associated with the individual drive circuits and embedded on the supply side. The electric elements are connected to the supply side of the power electronics unit or partial power electronics unit either directly or, optionally, via individually associated converters, e.g. DC/DC converters. By means of these, it is possible on the one hand to realize an electric hybrid drive of the correspondingly equipped vehicle, and on the other hand it is possible by means of the electric elements to support the afore-mentioned compensation measures in case of failure of individual drive circuits. The electric primary elements, i.e. elements that can be discharged only, include e.g. fuel cells, overhead lines allowing no back feeding, and primary batteries; the electric secondary elements, i.e. elements that can take up and discharge energy, include e.g. the magneto-dynamic storage device MDS, secondary driving batteries and overhead lines allowing back feeding. In this regard, the driving batteries may remain associated with the individual drive circuits, however, it is preferred then to provide only one central driving battery, with the drive circuits then being interconnected on the supply side.

Drive circuits interconnected on the supply side provide for the preferred possibility that the electric brake means still remain associated with the individual drive circuits and are operated independently, i.e. in association with the respective drive circuit. Due to this distribution, namely a common supply of the drive circuits, but unchanged distribution of the brake means (e.g. brake inverter power electronics systems with associated resistors) to the individual drive circuits, vehicles equipped in this manner can achieve particularly high safety with respect to the electric braking function while the drive function and thus the superimposition steering function is less critical at the same time. This is the case e.g. in land vehicles having a plurality of electrically driven individual wheels.

As an alternative, it is possible to connect suitable electrically operated additional consumers to drive circuits that are interconnected on the supply side.

According to an additional development of the invention, it is provided that each system control unit has direct information connections to the control connections between all other system control units and the power electronics units, the motors and the generator(s) and takes over the tasks or functions thereof in case of failure of one or all system control units. In accordance with this development, one of the still intact system control units in case of failure of one or more system control units, directly takes over the function of the failed system control unit or units, i.e. irrespective of the state of the drive circuits connected to the system control units.

Especially for vehicles having a high demand in terms of torque capability and power capability, there are preferably suited drive motors and/or generators with permanent-magnetic excitation of the rotor, and in a special design this rotor is constructed with flux concentration of the permanent magnets and the magnetic flux conduction parts.

BRIEF DESCRIPTION OF THE SEVERAL VIEWS OF THE DRAWINGS

In the following, embodiments of the invention will be elucidated in more detail by way of the drawings in which.

DETAILED DESCRIPTION OF THE INVENTION

Figure 1:
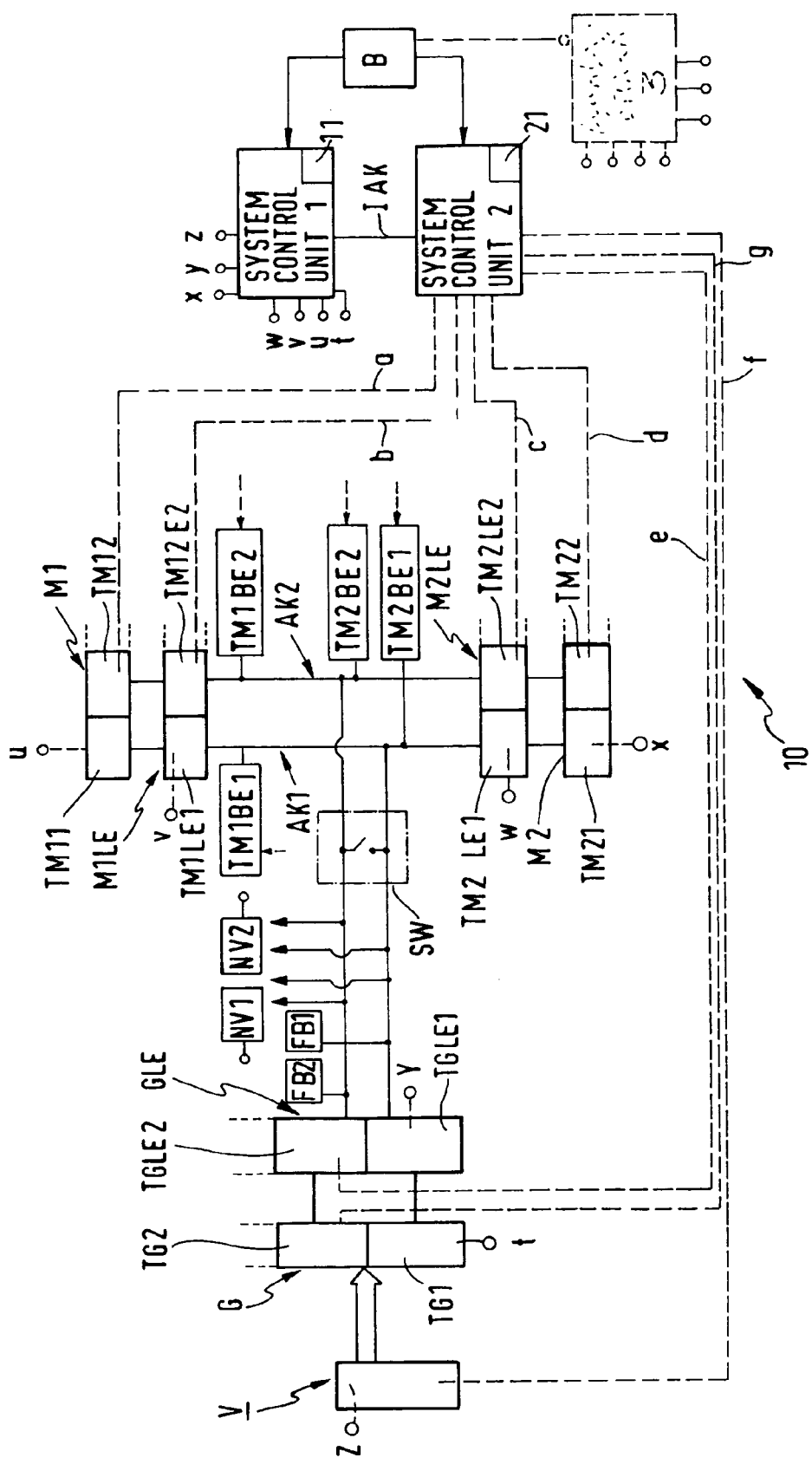
FIG. 1 shows a schematic block diagram of an electric drive unit for a vehicle according to an embodiment of the invention.

The electric drive system generally designated 1 in FIG. 1 is suited in particular for vehicles having electric motor drives that are separately provided for the left-hand and right-hand vehicle sides; however, the invention can also be applied to other electric drive systems, as will become evident to the skilled person upon reading of this description of the invention.

Starting from the left-hand side in FIG. 1, the drive system comprises a combustion engine V that drives an electric generator G via a drive shaft schematically illustrated here by an arrow. The electric generator G—just like the drive motors mentioned further below—is designed as electric machine with permanent-magnet rotor and includes flux concentration for permanent magnets and the parts serving for conducting magnetic flux.

The electric generator G is split to two partial generators TG1 and TG2, and in case of a total power of e.g. 600 kW of the generator G, each thereof delivers 50% power, i.e. each partial generator TG1 and TG2 delivers 300 kW.

The electric output lines of the partial generators TG1 and TG2 are coupled to a generator power electronics unit GLE, one being associated with a partial generator power electronics unit TGLE1 and the other being associated with a partial generator power electronics unit TGLE2. The outputs thereof generate a powerful direct voltage level and thus constitute a direct-voltage intermediate circuit each, from which electric power is withdrawn for two drive motors M1 and M2. FIG. 1 shows at the top an electric drive motor M1 that is constituted by two partial motors TM11 and TM12 each having a partial motor power electronics unit TM1LE1 and TM1LE2, respectively, associated therewith, which are combined to form a motor power electronics unit M1LE for the motor M1.

Partial motor and partial generator power electronics units are also briefly referred to as partial electronics units.

Shown at the bottom of FIG. 1 is the splitting of motor M2 into two partial motors TM21 and TM22 having partial motor power electronics units TM2LE1 and TM2LE2 associated therewith, which are part of a motor power electronics unit M2LE.

In all of the afore-mentioned partial units of the generator, the generator power electronics unit, the motors M1 and M2 and the motor power electronics units M1LE and M2LE, the broken lines illustrated indicate that there are or may be connected further partial units theoretically.

With unchanged total power of the drive, e.g. three partial units then would be designed for one third of the total power each.

Furthermore, the partial power electronics units have partial brake means TM1BE1, TM1BE2, TM2BE1 and TM2BE2 associated therewith.

The partial generators TG1 and TG2 as well as the partial generator power electronics units TGLE1 and TGLE2, together with the associated motor elements, constitute a drive circuit AK1 and AK2, respectively. All partial units having the final figure "1" belong to drive circuit 1, and all partial units having the final figure "2" belong to drive circuit 2.

Illustrated on the right-hand side of FIG. 1 are two system control units 1 and 2. In the following, the connection between the individual components of the drive system 2 to the system control unit 2 is to be discussed first.

Control lines a, b, . . . g shown in broken lines lead from the system control unit 2 to the afore-mentioned components of the drive system. A signal line a leads from system control unit 2 to partial motor TM12, a control line b leads to partial motor power electronics unit TM1LE2, a signal line c leads to partial motor power electronics unit TM2LE2, a signal line d leads to partial motor TM22, a signal line e leads to partial generator power electronics unit TGLE2, and a signal line f leads to combustion engine V in order to control and regulate this combustion engine. A signal line g leads to partial generator TG2.

Via the signal lines mentioned or via separate signal lines that are not illustrated, the system control unit 2 obtains feedback information from the individual units, in particular information on the operating state (proper operation, rotational speeds, currents, temperatures, malfuction, partial malfunction etc.).

The system control unit 1 shown to the upper right in FIG. 1 also is connected to the combustion engine V and to the corresponding partial unit of the generator G and of motors M1 and M2 as well as the associated power electronics units. In order to not excessively burden the drawings, the components each have control terminals illustrated thereon which are connected, via lines that are not shown, to control terminals on system control unit 1 which are correspondingly designated t, u, v, . . . z.

It is to be pointed out for the sake of completeness that the control and signal lines of partial machines and partial electronics units belonging together can be combined in a common line; they can be designed e.g. as bus line.

The system control unit 1 thus is associated with the drive circuit AK1, and the system control unit 2 is associated with the drive circuit AK2.

With respect to the alternative variation mentioned hereinbefore, namely to use three or four or still more partial units instead of the only two partial units in the drive system 1, FIG. 1 shows on the right-hand side thereof, in broken lines, a system control unit 3 provided for a third drive circuit.

All system control units contain a detector circuit 11 and 21, respectively, which senses the operating state of the connected units by way of the state signals fed back to the particular system control unit. An operating element unit B reports e.g. driving signals (speed, braking etc.) to the system control units which then convert the operating signals into corresponding control signals for the partial units of the generator, the drive motors, the power electronics units and possibly of the combustion engine.

The system control units 1 and 2 are mutually connected via an information exchange channel IAK. There is a continuous exchange of information between the system control units in both directions. In case of failure of one system control unit, the still intact other system control unit can take over the function of the former and/or may carry out compensation measures by corresponding control of the elements associated with its drive circuit.

The respective direct-voltage intermediate circuit of the drive circuits AK1 and AK2 may have driving batteries FB1 and FB2 connected thereto as primary or secondary elements, respectively, and may have suitable additional consumers connected thereto, for example a coolant pump, a blower or the like. Such additional consumers or loads are illustrated here schematically at NV1 and NV2. They are each fed alternatively from the direct-voltage intermediate circuits of drive circuit AK1 or AK2.

An additional or alternative possibility of electric feeding or supply is the interconnection of the direct-voltage intermediate circuits, wich is illustrated here by a symbolic switch SW.

In the embodiment according to FIG. 1, each drive circuit AK1, AK2, . . . has a system control unit 1, 2, . . . associated therewith. The two system control units 1 and 2 are connected via an information exchange channel IAK. In case of additional system control units, there are possibly all system control units mutually connected.

Figure 2:
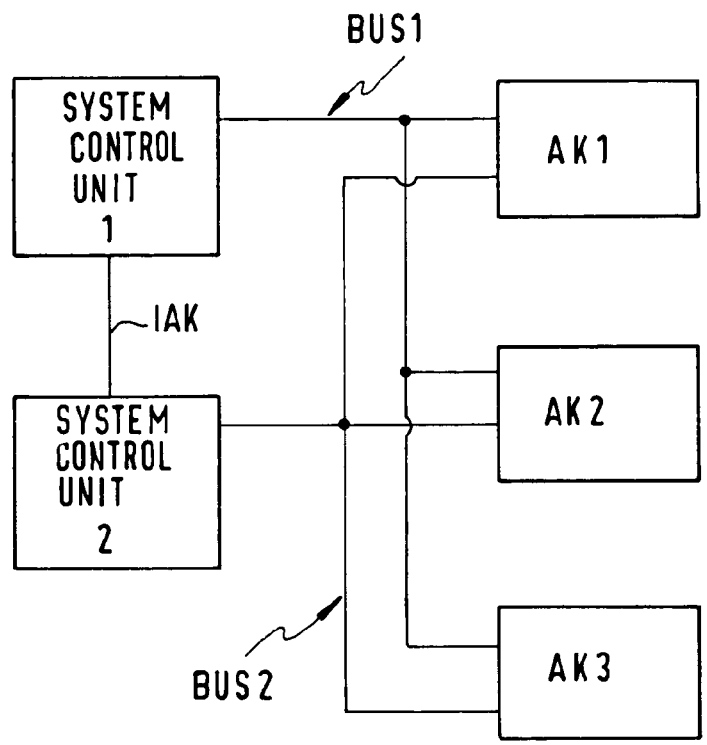
FIG. 2 shows a schematic block diagram of a second, alternative embodiment of an electric drive system according to the invention.

FIG. 2 illustrates an alternative embodiment, having a total of three drive circuits AK1, AK2 and AK3. Two system control units 1 and 2 have all drive circuits AK1, AK2 and AK3 connected thereto in one-channel form via a BUS1 and a BUS2, respectively. If, in the embodiment according to FIG. 2, e.g. the bus line BUS1 suffers a malfunction in the vicinity of system control unit 1, the drive circuits AK1, AK2 and AL3 then may be fed exclusively from system control unit 2 as the same receives corresponding information via the information exchange channel IAK. The same holds correspondingly in case of a malfunction of the system control unit 1 proper. To this end, a direct connection of the system control unit 2 is provided to BUS1 via the information exchange channel IAK, which is not illustrated in more detail.

Figure 3:
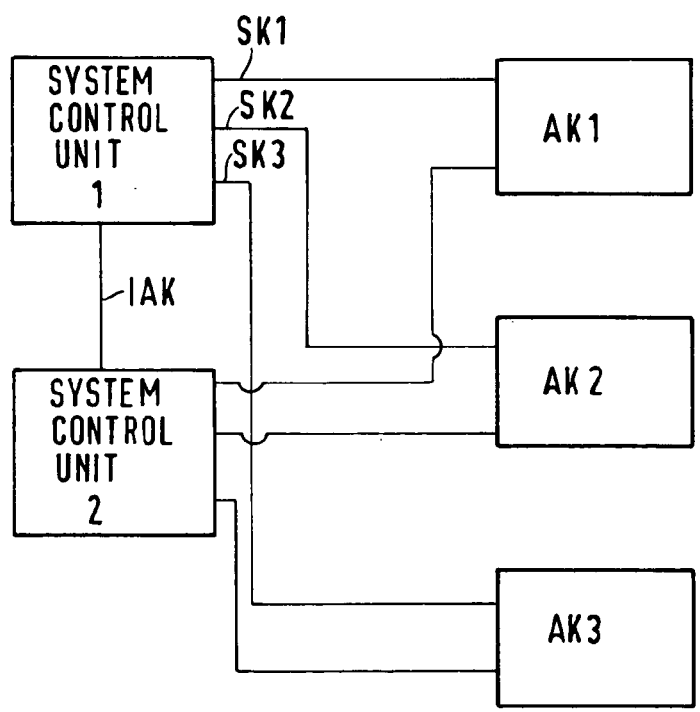
FIG. 3 shows an alternative design, with respect to the embodiment of FIG. 2, of the connection between the system control units and the drive circuits according to a third embodiment of the invention.

In case of a malfunction of the bus line BUS1 in FIG. 2 in the vicinity of system control unit 1, system control unit 2 would take over the total supply of the drive circuits via the line BUS2. A more favorable alternative as regards malfunction in the connecting lines, is the third embodiment of the invention according to FIG. 3. In this case, there are provided in total three signal output channels SK1, SK2 and SK3 of the system control unit 1, with one channel each being provided for each drive circuit AK1, AK2 and AK3, respectively. The system control unit 2 is also connected, via channels not designated in more detail here, to each of the drive circuits Ak1, AK2 and AK3. In case of failure e.g. of channel SK1, this affects only the connection between system control unit 1 and drive circuit AK1, but system control unit 1 can still supply the two drive circuits AK2 and AK3, while system control unit 2 can supply all drive circuits.

What is claimed is:

1. An electric drive system for vehicles, comprising:
   a first drive motor and a second drive motor each subdivided into at least a first partial motor and a second partial motor;
   a generator driven by a combustion engine, the generator subdivided into at least a first partial generator and a second partial generator;
   a first power electronics unit associated with the first drive motor and subdivided into at least a first partial power electronics unit associated with the first partial motor of the first drive motor and a second partial power electronics unit associated with the second partial motor of the first drive motor;
   a second power electronics unit associated with the second drive motor and subdivided into at least a first partial power electronics unit associated with the first partial motor of the second drive motor and a second partial power electronics unit associated with the second partial motor of the second drive motor;
   a third power electronics unit associated with the generator and subdivided into at least a first partial power electronics unit associated with the first partial generator and a second partial power electronics unit associated with the second partial generator;
   a first drive circuit comprising the first partial power electronics units of the first, second, and third power electronics units;
   a second drive circuit comprising the second partial power electronics units of the first, second, and third power electronics units;
   a first master system control unit associated with at least the first drive circuit;
   a second master system control unit associated with at least the second drive circuit, the first and second master system control units being connected to one another via an information exchange channel;
   a first operating element connected to the first master system control unit and a second operating element connected to the second master system control unit; and
   a detector adapted to detect a failure in at least one of the first drive circuit and the second drive circuit.

2. The system of claim 1, wherein the first and second drive circuits each have a first input channel connected to the first drive circuit and a second input channel connected to the second drive circuit.

3. The system of claim 1, wherein the master system control units each have a plurality of control channels corresponding in number to that of the drive circuits which in turn have control channels in a number corresponding to that of the master system control units, with one control channel each of the master system control units being connected to one control channel of each of the drive circuits.

4. The system of claim 1, wherein the first and second master system control units operate symmetrically within the first and second drive circuits.

5. The system of claim 1, wherein the first and second master system control units control the first and second drive circuits such that each drive circuit is in charge of a defined portion of total power and individual drive circuits are successively turned off and on in accordance with power demand.

6. The system of claim 5, wherein the first and second master system control units calculate the association of the first and second drive circuits with respect to the associated portion of the total power in a time pattern.

7. The system of claim 1, wherein the first and second drive circuits have electric means for taking up electrical energy.

8. The system of claim 7, wherein the electric means are brakes associated with the partial power electronics units of the first and second drive motors.

9. The system of claim 8, wherein a first set of brakes is associated with the first drive circuit and a second set of brakes is associated with the second drive circuit, and the first set of brakes and the second set of brakes are operated independently of one another.

10. The system of claim 1, wherein the first and second master system control units engage in control and regulation of the combustion engine.

11. The system of claim 1, wherein the first and second master system control units are mutually coordinated and regulate the first and second drive circuits to provide a defined power/torque at the first and second drive motors.

12. The system of claim 11, wherein the first and second master system control units preset a defined superimposition power/a defined superimposition torque on at least one of the first and second drive motors.

13. The system of claim 11, wherein the first and second master system control units receive feedback information from the first and second drive motors on the actual delivered power/torque, and perform corresponding regulating operations.

14. The system of claim 1, wherein one of the first or second drive circuits can compensate for a failure in the other of the first or second drive circuits.

15. The system of claim 1, further comprising electric, energy-storing primary/secondary elements associated with the first and second drive circuits.

16. The system of claim 1, wherein suitable electrically operated additional loads are selectively connected to at least one of the first or second drive circuits.

17. The system of claim 1, wherein the first and second drive circuits are interconnected by current lines between the corresponding partial electronics units of the first and second drive circuits.

18. The system of claim 1, wherein each of the first and second master system control units has a direct information connection to the other of the first and second master system control units and to the first and second drive circuits, and in case of failure of one of the first and second master system control units, the other master system control unit takes over its functions.

19. The system of claim 1, wherein at least one of the first drive motor, the second drive motor, or the generator is designed with permanent-magnetic rotor excitation.

20. The system of claim 19, wherein the rotor with permanent-magnetic excitation is designed with flux concentration of permanent magnets and magnetic flux conduction parts.

* * * * *